Patented Apr. 27, 1954

2,676,943

UNITED STATES PATENT OFFICE 2,676,943

FILM FOR PACKAGING RED MEATS

Clarence M. Carson, Cuyahoga Falls, Ohio, assignor, by mesne assignments, to The Goodyear Tire & Rubber Company, a corporation of Ohio No Drawing. Application August 18, 1950, Serial No. 180,306

5 Claims. (Cl. 260—31.8)

This invention relates to vinyl film for packaging red meats. The film preserves the red color of the meats.

The prepackaging of meats for self-service stores and the like has been retarded by the fact that when wrapped in a usual transparent wrapper, meats, such as beef, etc., darken rapidly. The darkened meat is not as attractive as the red meat and does not lend itself for display in self-service stores. The film of this invention is so composed that it preserves the red color of so-called red meats for at least ninety-six hours at 35° F.

In referring to red meats the trade thinks particularly of beef, but the expression is not limited to beef, but includes also lamb, veal, pork, horse meat for pets, and game meats such as venison, bear, etc. The length of time that the red color of a meat can be preserved depends somewhat on the nature of the meat and the reference herein to a film which preserves the color of a red meat for ninety-six hours at 35° F. relates more particularly to preserving the color of a cut of beef.

For different meats the period during which the meat is to be displayed will vary. For instance, ground meats such as hamburger, etc., have a much greater surface exposed to the air than the surface exposed on the same weight of sliced roast or steak. The butcher realizes this and hamburger is never ground for display more than four hours before the time it is presumed that it will be sold. The test of whether a film is satisfactory is whether it will protect freshly sliced beef for four days at 35° F.

To explain the discoloration of red meats, reference is had to reduced hemoglobin and its relation to oxyhemoglobin and methemoglobin. Oxyhemoglobin and methemoglobin are both obtainable from reduced hemoglobin, the former by oxygenation and the latter by oxidation. In oxyhemoglobin the oxygen is loosely held and can be removed by a vacuum pump. The conversion of reduced hemoglobin to oxyhemoglobin is, therefore, a process of oxygenation and the iron present in the reduced hemoglobin is not oxidized during the process, but remains as ferrous iron in the oxyhemoglobin.

Reduced hemoglobin makes the meat which contains it dark red or purple in color, due to its content of ferrous iron. This is the color of the center of the meat, and the color of the meat when it is first cut. If the fresh cut is exposed to air, the dark red hemoglobin takes up oxygen from the air and forms bright red oxyhemoglobin. The color of each is attractive and is due, at least largely, to the ferrous iron which is present.

Methemoglobin is an oxidation product. Its iron content is present as ferric iron instead of ferrous iron as in reduced hemoglobin and oxyhemoglobin. It is the conversion of the ferrous iron to ferric iron that causes meat to turn dark brown as the reduced hemoglobin or oxyhemoglobin is oxidized to methemoglobin.

Unrestricted exposure to the atmosphere, particularly under pressure, tends to produce oxyhemoglobin from reduced hemoglobin. A wrapper that excludes most of the air hastens the production of methemoglobin and causes the meat to turn dark brown. A wrapper that is of such a composition and thickness that air diffuses into the package, keeping an excess present, prevents or retards the formation of methemoglobin. The high oxygen transmission required to keep the meat red is obtainable in vinyl film by plasticizing to increase the gas permeability of the film. However, a low plasticizer content is desirable to prevent loss of moisture with consequent dehydration of the meat. The specifications for a red meat film have been determined to be (1) a water-vapor transfer rate (determined by the method adopted by The Technical Committee of The Packaging Institute and published in Modern Packaging, vol. 19, No. 12, page 146, August 1946) between nine and sixteen grams per one hundred square inches in twenty-four hours and (2) an oxygen-diffusion rate (determined by the method and equipment described in Modern Packaging, vol. 20, No. 2, page 156, October 1946, and since adopted as standard by The Technical Committee of The Packaging Institute) between two hundred ninety and fifteen hundred cubic centimeters per one hundred square inches in twenty-four hours. Red meats, such as beef roasts and steaks, packaged in such films, maintain their red color and attractive appearance when kept in open refrigerating cabinets at 35° F. for four days or more. To maintain the red color it is of course necessary to give the meat access to the air; the wrapped packages are not to be packed against one another so tightly that the air circulation is cut off.

The films referred to herein as vinyl films are composed essentially of polymer derived from 90 to 100 parts of vinyl chloride and 0 to 10 parts of another mono-olefinic monomer copolymerizable with vinyl chloride including vinylidene chloride, ethylene, a vinyl ester such as vinyl acetate, a dialkyl ester of an ethylene dicarboxylic acid such as diethyl maleate, diethyl fumarate, dimethyl maleate, dimethyl fumarate, dipropyl maleate and fumarate, dibutyl maleate and fumarate and the corresponding chloromaleates and chlorofumarates, the alkyl group in each case containing one to twelve carbons. These vinyl films permit visual inspection of the meat wrapped therein by virtue of the ability of the film to transmit light. These vinyl films range in ability to transmit light from a value of transparency to one of translucency. Both the transparent and translucent film are substantially equally effective in their ability to permit visual inspection of the meat when the film is in direct contact with the meat. To prevent film from fogging by moisture condensing on its inner surface when the package is removed from refrigeration, it may be necessary to coat the inner surface of the film with a hydrophilic agent, although most highly plasticized vinyl films will not fog. It is desirable to dust the film with starch or other non-blocking agent or incorporate a non-blocking agent in the film.

The film is at least .0007 inch thick and not over .001 inch thick, and it is contemplated that the red meat will be enclosed in a single ply of it. The film will be overlapped and the edges held together by either a continuous seal, or sealed at separated points, or it may be tied or held with adhesive tape or the like. Thicker films are too resistant to the passage of moisture and oxygen to be satisfactory.

The film contains not more than 35 parts and preferably from 30 to 35 parts of liquid plasticizer per 100 parts of copolymer. The liquid plasticizers which may be employed include any of those approved for use in films which contact meats such as, for example, the alkyl esters of carboxylic acids such as stearates, palmitates, sebacates, etc.; alkyl phthalates, suitable phosphates, etc. The following films are representative. Each of these specific films was cast from a solution of the vinyl composition described.

*Example 1*

This film was made from the polyvinyl chloride known as Geon 101. The film was cast from a solution which has the following composition:

| | Parts |
|---|---|
| Polyvinyl chloride | 100 |
| Dioctyl sebacate | 15 |
| Silica aerogel | 5 |
| Dibutyl sebacate | 15 |
| Methyl ethyl ketone | 530 |
| Toluene | 240 |

The film .0009 inch thick had a water-vapor transfer rate of 15 grams/100 sq. inches/24 hours and an oxygen diffusion rate of 1500 cc./100 sq. inches/24 hours. Beef sealed in a single ply of the film was prevented from discoloration for 120 hours when kept at 35° F., the temperature of a self-service refrigerator.

*Example 2*

This film was obtained by blending two copolymers. 50 parts of (1) the copolymer resulting from the polymerization of a mixture comprising 95 parts of vinyl chloride and 5 parts of ethyl maleate was blended with 50 parts of (2) the copolymer resulting from the polymerization of a mixture comprising 95 parts of vinyl chloride and 5 parts of vinyl acetate.

The film was cast from a solution which had the following composition:

| | Parts |
|---|---|
| Copolymer blend | 100 |
| Dioctyl sebacate | 18 |
| Dibutyl sebacate | 15 |
| Silica aerogel | 5 |
| Methyl ethyl ketone | 500 |
| Toluene | 210 |

Film of this composition .001 inch thick successfully protected red meat from discoloration for four days at 35° F. under the conditions referred to in Example 1. The film had a water-vapor-transfer rate of 10 grams/100 sq. inches/24 hours and an oxygen diffusion rate of 812 cc./100 sq. inches/24 hours.

*Example 3*

The copolymer of this example was prepared by polymerizing a mixture containing 97 parts of vinyl chloride and 3 parts of vinyl acetate.

The film was cast from a solution which had the following composition:

| | Parts |
|---|---|
| Copolymer | 100 |
| Dioctyl sebacate | 18 |
| Dibutyl sebacate | 15 |
| Silica aerogel | 5 |
| Methyl ethyl ketone | 500 |
| Toluene | 210 |

Film of this composition .001 inch thick prevented discoloration of beef for four days when preserved at 35° F. under the conditions set forth in Example 1. This film had a water-vapor transfer rate of 21 grams/100 sq. inches/24 hours and an oxygen diffusion rate of 1500 cc./100 sq. inches/24 hours.

*Example 4*

The vinyl copolymer used in the preparation of this film is obtained by polymerizing a mixture containing 90 parts of vinyl chloride and 10 parts of vinylidene chloride. It is known commercially as Geon 202.

The film was cast from a solution containing:

| | Parts |
|---|---|
| Copolymer | 100 |
| Dioctyl sebacate | 18 |
| Dibutyl sebacate | 15 |
| Silica aerogel | 5 |
| Methyl ethyl ketone | 333 |
| Toluene | 140 |

Film of this composition .0012 inch thick had a water-vapor transfer rate of 16 grams/100 sq. inches/24 hours and an oxygen diffusion rate of 1200 cc./100 sq. inches/24 hours. Beef steak wrapped in a single ply of this film was prevented from discoloring for 120 hours at 35° F. under the condition set forth in Example 1.

*Example 5*

The polymer of this film was polyvinyl chloride which was mixed with 25 parts of the solid plasticizer of a copolymer resulting from the polymerization of a mixture containing 67 parts butadiene-1,3 and 33 parts of acrylonitrile (known as GRN). The film was cast from a 20 per cent solids solution in a 60/40 methyl ethyl ketone/toluene mixture. The solids composition was as follows:

| | Parts |
|---|---|
| Polyvinyl chloride | 100 |
| GRN | 25 |
| Dibutyl sebacate | 7.5 |
| Methoxyethyl oleate | 7.5 |
| Silica aerogel | 5 |

Film .001 inch thick had a water-vapor transmission rate of 9 grams/100 sq. inches/24 hours and an oxygen transmission rate of 300 cc./100 sq. inches/24 hours.

*Example 6*

The polymer of this film was made by polymerizing a mixture comprising 95 parts of polyvinyl chloride and 5 parts diethyl fumarate. The film was cast from a solution containing the following:

| | Parts |
|---|---|
| Polymer | 100 |
| Dibutyl sebacate | 15 |
| Methoxyethyl oleate | 15 |
| Silica aerogel | 5 |
| Methyl ethyl ketone | 500 |
| Toluene | 210 |

Film of this composition .001 inch thick successfully protected sliced red meat from discoloration for four days at 35° F. and had a water-vapor transmission rate of 12 grams/100 sq. inches/24 hours and an oxygen transmission rate of 300 cc./100 sq. inches/24 hours.

The blend of copolymers may be varied. For instance, instead of using equal portions of the different copolymers containing at least 90 to 100 parts of vinyl chloride, the ratio my vary from 1 to 99 parts of either, with sufficient of the other to form one hundred parts. However, the vinyl chloride content of the polymers in the blend may be varied, using less than 90 parts of vinyl chloride as long as the resulting copolymer is compatible with the other polymers and as long as the ultimate analysis of the blended copolymers within the aforesaid range contains from 90 to 100 parts of vinyl chloride.

Although the non-fogging agent may be coated on the surface of the film as hereinbefore mentioned, it is preferable to add it to the film composition before casting. The preferred non-fogging agents are soluble in the solution of the vinyl chloride polymer composition in toluene and methyl ethyl ketone. Since these agents are less soluble in the solvent-free film, they migrate to the surface of the finished film after the solvent has evaporated from the film and form a film of agent on the surface of the polymer film where they then function to prevent fogging. A preferred non-fogging agent is polyethylene glycol di-laurate produced from a polyethylene glycol with a molecular weight of about 1500. Monocarboxylic acid esters of polyethylene glycol with a molecular weight of 400 to 4000, as, for example, the mono- and di-oleates, the mono- and di-stearates, and esters of other acids of 12 to 20 carbon atoms can be used satisfactorily. Also compounds sold by Armour & Company under the name "Ethofat" may be used. The compounds known as "Ethofat" are the monofatty- or resin-acid esters of polyethylene glycols. Other materials which act as non-fogging (NF) agents are as follows:

The reaction product of ricinoleic acid glycerides and H₂SO₄. Example—Turkey-red oil.

Aliphatic sulfates, the reaction products of long chain alcohols + H₂SO₄ + neutralization. Example—Duponol.

Amide derivatives, the reaction product of ethylene sulfonic acid and an amide. Example—Igepon T.

Aliphatic sulfonates, the reaction products of petroleum fractions and sulfonic acid. Example—Twitchell base.

Aryl alkyl sulfonates obtained by the sulfonation of naphthalene, diphenyl, etc. Example—Darvan.

Ethers and esters, obtained by the reaction of a fatty acid or alcohol with ethylene oxide. Example—Tween 40 (sorbitan monopalmitate polyoxyalkalene derivative).

Cation active compounds. Armour & Co. "Ethomeen" tertiary amines having one fatty alkyl group and two polyoxyethylene groups substituted on the nitrogen.

These compounds may be added to the vinyl composition in any proportion from 0.25 to 10 parts on 100 parts of polymer, depending on the solubility of the NF agent in the polymer, which governs the amount migrating to the surface. It is preferable that only enough NF agent migrate to the surface to form a continuous film of water condensate on the inside of the package.

The preferred amount of polyethylene glycol dilaurate having a molecular weight of 1500 which may be added, for example, to Example 6 is 2.5 parts.

The films of this invention make a desirable wrap for luncheon meats which contain a cured meat mixed with materials which cause the meat to rapidly change color. Brains, liver, hearts, kidneys, sweetbreads, and other animal by-products can be preserved in the film. Here the problem is not to prevent discoloration, but to prevent growth of anaerobic bacteria which cause spoilage with resultant sliming, etc., and to provide a liquid-tight package for the customer's protection. The films can also be used satisfactorily for wrapping ham, bacon, sausage, fish, poultry, chipped beef, cheese, fresh fruits and vegetables, etc. These films have such a high plasticizer content that they are strong and flexible at relatively low temperatures and can be used satisfactorily for wrapping frozen foods such as poultry, etc.

The foregoing examples are illustrative only and all parts are by weight unless otherwise indicated.

While certain representative embodiments and details have been shown for the purpose of illustrating the invention, it will be apparent to those skilled in this art that various changes and modifications may be made therein without departing from the spirit or scope of the invention.

What I claim is:

1. A non-blocking transparent vinyl polymer film from .0007 to .0012 inch thick containing 30 to 35 parts of a non-toxic liquid plasticizer and 5 parts of silica aerogel, the parts being per 100 parts of film-forming polymer, the vinyl polymer resulting from the polymerization of a mixture containing 90 to 100 parts of vinyl chloride and 0 to 10 parts of another polymerizable mono-olefinic compound, the film having a water vapor transfer rate of 9 to 16 grams of water per 100 square inches per 24 hours and an oxygen diffusion rate of 290 to 1500 cubic centimeters per 100 square inches per 24 hours.

2. Film as claimed in claim 1 in which the polymerizable mono-olefinic compound is a dialkyl ester of an ethylene dicarboxylic acid in which the alkyl group contains 1 to 12 carbon atoms.

3. Film as claimed in claim 2 in which the acid is selected from the group consisting of fumaric and maleic acids.

4. Film as claimed in claim 3 in which the liquid plasticizer is 15 parts of dioctyl sebacate and 15 parts of dibutyl sebacate.

5. Film as claimed in claim 4 in which the film-forming polymer is polyvinyl chloride.

References Cited in the file of this patent

UNITED STATES PATENTS

| Number | Name | Date |
| --- | --- | --- |
| 2,071,300 | Gammeter | Feb. 16, 1937 |
| 2,328,844 | Osterhof | Sept. 7, 1943 |
| 2,339,387 | Endres | Jan. 18, 1944 |
| 2,385,257 | Cavallito | Sept. 18, 1945 |
| 2,395,581 | Richter | Feb. 26, 1946 |
| 2,397,751 | Rand | Apr. 2, 1946 |
| 2,545,243 | Rumsey | Mar. 13, 1951 |